(12) United States Patent
Lei et al.

(10) Patent No.: US 10,085,183 B2
(45) Date of Patent: Sep. 25, 2018

(54) METHOD AND APPARATUS TO HANDLE USER EQUIPMENT CONTEXT FOR DUAL CONNECTIVITY IN ENHANCED SMALL CELL NETWORKS

(71) Applicant: NOKIA SOLUTIONS AND NETWORKS OY, Espoo (FI)

(72) Inventors: Yixue Lei, Beijing (CN); Kodo Shu, Beijing (CN); Haitao Li, Beijing (CN); Seppo Ilmari Vesterinen, Oulunsalo (FI); Xiang Xu, Jiangsu (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/908,768

(22) PCT Filed: Jul. 2, 2014

(86) PCT No.: PCT/EP2014/064026
§ 371 (c)(1),
(2) Date: Jan. 29, 2016

(87) PCT Pub. No.: WO2015/014560
PCT Pub. Date: Feb. 5, 2015

(65) Prior Publication Data
US 2016/0165492 A1 Jun. 9, 2016

Related U.S. Application Data

(60) Provisional application No. 61/860,414, filed on Jul. 31, 2013.

(51) Int. Cl.
*H04W 36/08* (2009.01)
*H04W 36/00* (2009.01)
(Continued)

(52) U.S. Cl.
CPC ... *H04W 36/0061* (2013.01); *H04W 36/0083* (2013.01); *H04W 36/08* (2013.01);
(Continued)

(58) Field of Classification Search
CPC ... H04B 7/0626; H04B 7/0632; H04L 1/0023; H04L 1/1812; H04L 1/1841; H04L 5/003;
(Continued)

(56) References Cited

U.S. PATENT DOCUMENTS 9,420,501 B2 * 8/2016 Lei ..................... H04W 36/0055
2007/0099561 A1 * 5/2007 Voss ....................... H04W 24/00
455/12.1

(Continued)

FOREIGN PATENT DOCUMENTS

WO WO 2013/123643 A1 8/2013

OTHER PUBLICATIONS

International Search Report and Written Opinion dated Sep. 30, 2014 corresponding to International Patent Application No. PCT/EP2014/064026.
(Continued)

*Primary Examiner* — Nimesh Patel
(74) *Attorney, Agent, or Firm* — Squire Patton Boggs (US) LLP (57) ABSTRACT

Systems, methods, apparatuses, and computer program products for handling user equipment (UE) context for dual connectivity in, for example, enhanced small cell networks are provided. One method includes associating small cell identifiers that are assigned by an anchor evolved node B (eNB) with a unique cell identifier related to the anchor eNB, and reporting user equipment (UE) history information in dual connectivity mode to a target evolved node B (eNB). The UE history information comprises at least the unique cell identifier of the anchor eNB.

14 Claims, 2 Drawing Sheets

Associating small cell identifiers that are assigned by an anchor eNB with a unique higher level identifier related to the anchor eNB — 200

Reporting the UE history information in dual connectivity mode to a target eNB — 210

(51) Int. Cl.
  *H04W 48/16* (2009.01)
  *H04W 76/15* (2018.01)
  *H04W 84/04* (2009.01)

(52) U.S. Cl.
  CPC ........... *H04W 48/16* (2013.01); *H04W 76/15* (2018.02); *H04W 36/0055* (2013.01); *H04W 84/045* (2013.01)

(58) Field of Classification Search
  CPC ....... H04L 12/189; H04L 43/16; H04L 47/24; H04L 5/006; H04L 5/0032; H04L 63/162; H04L 63/104; H04L 63/20; H04L 67/16; H04W 36/0016; H04W 36/0055; H04W 36/02; H04W 36/24; H04W 72/0406; H04W 88/06; H04W 36/0083; H04W 24/10; H04W 72/082; H04W 16/14; H04W 36/14; H04W 72/1215; H04W 88/10; H04W 36/20; H04W 36/245; H04W 72/00; H04W 88/02; H04W 36/0066; H04W 36/30; H04W 76/02; H04W 8/08; H04W 36/00; H04W 36/04; H04W 36/0061; H04W 4/028; H04W 60/04; H04W 72/04; H04W 84/047; H04W 28/18; H04W 36/18; H04W 88/08; H04W 36/0011; H04W 48/16; H04W 80/00; H04W 36/0033; H04W 16/32; H04W 24/00; H04W 72/0493; H04W 88/12; H04W 8/186
  See application file for complete search history.

(56) References Cited

U.S. PATENT DOCUMENTS

| | | |
|---|---|---|
| 2010/0173626 A1 | 7/2010 | Catovic et al. |
| 2010/0234027 A1* | 9/2010 | Han .................. H04W 36/0083 455/436 |
| 2012/0015655 A1 | 1/2012 | Lee |
| 2012/0088508 A1* | 4/2012 | Matsuo .................. H04W 24/10 455/436 |
| 2015/0312818 A1* | 10/2015 | Yiu .................. H04W 36/0094 455/436 |

OTHER PUBLICATIONS

3GPP TR 36.842 V0.2.0 (May 2013), Technical Report, 3rd Generation Partnership Project; Technical Specification Group Radio Access Network; evolved Universal Terrestrial Radio Access (E-UTRA); Study on Small Cell Enhancements for E-UTRA and E-UTRAN—Higher layer aspects (Release 12), Jun. 2, 2013, pp. 1-38, XP050692536.
European Office Action corresponding the Application No. 14 736 725.4, dated Jun. 28, 2018.

* cited by examiner

METHOD AND APPARATUS TO HANDLE USER EQUIPMENT CONTEXT FOR DUAL CONNECTIVITY IN ENHANCED SMALL CELL NETWORKS

CROSS-REFERENCE TO RELATED APPLICATIONS

This application claims priority to U.S. Provisional Application No. 61/860,414 filed on Jul. 31, 2013. The entire contents of this earlier filed application is hereby incorporated by reference in its entirety.

BACKGROUND

Field

Embodiments of the invention generally relate to mobile communications networks, such as, but not limited to, the Universal Mobile Telecommunications System (UMTS) Terrestrial Radio Access Network (UTRAN), Long Term Evolution (LTE) Evolved UTRAN (E-UTRAN), and/or LTE-A.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the evolved Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and multimedia transport in addition to high-capacity voice support. Advantages of LTE include, for example, high throughput, low latency, FDD and TDD support in the same platform, an improved end-user experience, and a simple architecture resulting in low operating costs.

Further releases of 3GPP LTE (e.g., LTE Rel-10, LTE Rel-11, LTE Rel-12) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment is directed to a method comprising associating, for example by a user equipment, small cell identifiers that are assigned by an anchor evolved node B (eNB) with a unique cell identifier related to the anchor eNB. The method may further comprise reporting user equipment (UE) history information in dual connectivity mode to a target evolved node B (eNB). The UE history information may comprise at least the unique cell identifier of the anchor eNB.

In an embodiment, the UE history information may further comprise cell type information and the small cell identifiers associated with the unique cell identifier. According to one embodiment, the reporting may further comprise reporting visited small cell information in dual connectivity mode to the target eNB in inter anchor eNB handover.

In an embodiment, the method may further comprise providing a new handover cause information element together with the UE history information. According to one embodiment, the visited small cell information may comprise E-UTRAN cell specific information. The cell type information may comprise cell visibility information.

Another embodiment is directed to an apparatus comprising at least one processor and at least one memory including computer program code. The at least one memory and computer program code may be configured, with the at least one processor, to cause the apparatus at least to associate small cell identifiers that are assigned by an anchor evolved node B (eNB) with a unique cell identifier related to the anchor eNB, and to report user equipment (UE) history information in dual connectivity mode to a target evolved node B (eNB). The UE history information may comprise at least the unique cell identifier of the anchor eNB.

Yet another embodiment is directed to an apparatus comprising associating means for associating small cell identifiers that are assigned by an anchor evolved node B (eNB) with a unique cell identifier related to the anchor eNB. The apparatus may also comprise reporting means for reporting user equipment (UE) history information in dual connectivity mode to a target evolved node B (eNB). The UE history information may comprise at least the unique cell identifier of the anchor eNB.

In an embodiment, the UE history information may further comprise cell type information and the small cell identifiers associated with the unique cell identifier. According to one embodiment, the reporting means may further comprise means for reporting visited small cell information in dual connectivity mode to the target eNB in inter anchor eNB handover.

In one embodiment, the apparatus may further comprise providing means for providing a new handover cause information element together with the UE history information. The visited small cell information may comprise E-UTRAN or UTRAN cell specific information.

According to an embodiment, the cell type information may comprise cell visibility information. The apparatus may comprise a user equipment.

Another embodiment is directed to a method comprising receiving, by an evolved node B (eNB), user equipment (UE) history information from a user equipment (UE). The UE history information may comprise an anchor eNB identifier, cell type information, and a small cell identifier associated with a unique cell identifier of the anchor eNB.

In an embodiment, the receiving may further comprise receiving visited small cell information during inter anchor eNB handover. According to one embodiment, the method may further comprise checking the visited small cell information to determine whether any ping-pong handovers have occurred.

In an embodiment, the cell type information may comprise cell visibility information. According to one embodiment, the method may further comprise calculating a mobility state estimation (MSE) based on at least one of a number of cell changes determined from the visited small cell information and the UE history information. In on embodiment, the calculating may further comprise determining whether hidden small cells anchored by a source eNB are included in the calculation of the mobility state estimation (MSE).

Another embodiment is directed to an apparatus comprising at least one processor and at least one memory including computer program code. The at least one memory and computer program code may be configured, with the at least one processor, to cause the apparatus at least to receive user equipment (UE) history information from a user equipment (UE). The UE history information may comprise an anchor eNB identifier, cell type information, and a small cell identifier associated with a unique cell identifier of the anchor eNB.

Another embodiment is directed to an apparatus comprising receiving means for receiving user equipment (UE) history information from a user equipment (UE). The UE history information may comprise an anchor eNB identifier, cell type information, and a small cell identifier associated with a unique cell identifier of the anchor eNB.

In an embodiment, the apparatus may be an evolved node B (eNB), such as a target eNB. According to one embodiment, the receiving means may further comprise means for receiving visited small cell information during inter anchor eNB handover.

In one embodiment, the apparatus may further comprise checking means for checking the visited small cell information to determine whether any ping-pong handovers have occurred. According to an embodiment, the cell type information may comprise cell visibility information.

According to one embodiment, the apparatus may further comprise calculating means for calculating a mobility state estimation (MSE) based on at least one of a number of cell changes determined from the visited small cell information and the UE history information. In an embodiment, the calculating means may further comprise means for determining whether hidden small cells anchored by a source eNB are included in the calculation of the mobility state estimation (MSE).

Another embodiment is directed to a computer program, embodied on a computer readable medium. The computer program, when executed by a processor, causes the processor to perform a method including associating, for example by a user equipment, small cell identifiers that are assigned by an anchor evolved node B (eNB) with a unique cell identifier related to the anchor eNB. The method may further comprise reporting user equipment (UE) history information in dual connectivity mode to a target evolved node B (eNB). The UE history information may comprise at least the unique cell identifier of the anchor eNB.

Another embodiment is directed to a computer program, embodied on a computer readable medium. The computer program, when executed by a processor, causes the processor to perform a method including receiving, by an evolved node B (eNB), user equipment (UE) history information from a user equipment (UE). The UE history information may comprise an anchor eNB identifier, cell type information, and a small cell identifier associated with a unique cell identifier of the anchor eNB.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for handling UE context for dual connectivity in enhanced small cell networks, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to small cell enhancement (SCE), a study item in 3GPP Rel-12 mainly targeting local area deployment which can support high data rates for UE via small cells with non-ideal backhaul. Some embodiments may specifically apply where dual connectivity mode is used, whereby small cells are anchored by a macro eNB and these small cells are assigned local cell identifiers (IDs) which may be unique only under the anchor eNB. These local cell IDs are not unique across the set of anchor eNBs within a system.

Dual connectivity mode refers to when one UE has two radio connections with two radio access points, for example one macro and one small cell eNB. In 3GPP Rel-12, the macro and small cell eNBs are connected via non-ideal backhaul. Non-ideal backhaul causes the potential need for the small cell eNBs to work more independently compared with pico in Rel-11 carrier aggregation (CA) solution.

In conventional LTE and LTE-A systems, when handover happens between two macro eNBs, i.e., the source eNB and target eNB, the UE history information will be transferred from the source eNB to target eNB. Such UE history information can be used by target eNB to know the visited cells of the UE. This can be used for mobility state estimation as well. This UE history information includes a list of cells (e.g., up to 16 cells) that the UE was previously in, and the time the UE spent in each cell. This information can be used to detect high mobility UEs that should be handed off to the macrocell, and also to detect Ping-Pong handover. Ping-Pong handover means UE handovers among two cells frequently within a short time period which will cause unnecessary signaling load to the network and UE. This kind of handover is regarded as a problem that needs to be detected and then avoided by some measures such as mobility parameters adjustment.

Because the local cell IDs assigned by the anchor eNBs in a dual connectivity case are not unique under different anchor eNBs, the same locally assigned cell ID value can show up in the list of previously visited cells and some new local small cells under the new anchoring eNB, even though the value represents 2 or more cells. For example, this could be detected as a ping-ponging had occurred, when in fact it had not. Embodiments address the UE context information handling in SCE, especially considering the potential problems if small cells are hidden from the core network (CN) which leads to significant architecture changes compared with legacy pico/femto cell systems.

In conventional LTE systems, such as pico, since small cells are not hidden from CN, the cell identities can be transferred to the target eNB. The target eNB can then trace back the visited cells and also conduct mobility state estimation using such history information received from the source cell. In enhanced small cell architecture, small cells are hidden from CN at least for dual connectivity. Thus, certain embodiments mainly address the dual connectivity case.

For dual connectivity mode, the small cell IDs can be allocated by the anchor eNB and these IDs can be local identifiers. The small cell IDs being local means that by default it is not necessary to ensure the uniqueness of such IDs in multiple eNBs or even over a global area. Although there can be another option that inter-eNB coordination via X2 or OAM to be utilized to guarantee the uniqueness of small cell IDs. But it should be noted that this is not supported in current LTE systems, where the operations, administration, and maintenance (OAM) only ensures the cell ID to be unique for the corresponding eNBs since current E-UTRAN cell global identifier (E-CGI) is related to the eNB's 20-bit global eNB ID.

More specifically, the uniqueness of cell IDs for macro cell refers to each macro cell having E-CGI within one public land mobile network (PLMN). Compared with macro cell, the small cells in dual connectivity mode does not have a global unique cell ID, i.e., E-CGI, it just has a local cell ID which is only unique under one anchor/macro cell, meaning it may be duplicated under different macro cells.

Certain embodiments, however, assume that such inter-eNB coordination is optional and thus provide a solution without requiring uniqueness of small cell IDs under different anchor/macro eNBs. The reason is that considering future large scale deployment of small cells, inter-eNB coordination may bring unavoidable load to eNBs and it may be more serious if some small cells can have dynamic on/off feature for energy saving or dynamic changes of configurations. Such coordination will be needed only when a new small cell will be added to the network, or the need for cell reconfigurations is detected, e.g., neighboring cells have the same physical cell identity (PCI).

As a result, there is a need to handle UE context information, especially UE history information and also handover (HO) causes during handover. In the case where the UE history information is propagated to the neighboring eNBs during HO with the hidden small cells using conventional specification, the target eNB may treat the cells contained in UE history information as normal LTE cells (i.e., not hidden from CN), this may cause issues when such UE history information is used for certain purposes, such as during ping-pong detection, because the eNB may incorrectly consider the ping-pong being related to the eNB rather than small cell. And, if these cells are not included in the UE history information transferred to target eNB, the above problem in ping-pong detection may not occur, but then for mobility state estimation (MSE), it is not possible to take into the visited small cell into account. This would limit the flexibility of mobility state estimation.

In view of the above, one embodiment provides enhanced UE context handling, including an expanded UE history information structure, so that the visited small cells (SCells) in dual connectivity mode are reported to the target eNB in the inter anchor eNB handovers.

According to an embodiment, the expanded UE history information may include, in addition to the anchoring eNB/cell identifier in legacy UE history information, cell type information (hidden or non-hidden, to distinguish with legacy cells) and small cell IDs. In addition, a new HO cause is provided together with the new expanded UE history information structure to tackle ping-pong HO issues.

Considering the uncertainty for MSE of dual connectivity mode UEs on whether to take into account the small cells, the new expanded UE history information structure can support both options. Accordingly, this provides freedom for MSE solution selection for dual connectivity UE.

According to an embodiment, the UE History Information Element (IE) contains information about cells that a UE has been served by in active state prior to entering the target cell. Table 1 depicts an example of the UE history information structure, according to an embodiment. As mentioned above, in one embodiment, the UE history information structure is enhanced by making the local cell IDs that are assigned by the anchor eNB unique by associating them with a unique cell ID related to the anchor eNB. Table 2 depicts the range for the maximum length of the last visited cell list specified in 3GPP Rel-11.

TABLE 1

| IE/Group Name | Presence | Range | IE type and reference | Semantics description | Criticality | Assigned Criticality |
|---|---|---|---|---|---|---|
| Last Visited Cell List | | 1 to <MaxNrOf Cells> | | Most recent information is added to the top of this list | — | — |
| Last Visited Cell Information | M | | 9.2.1.43 | | — | — |

TABLE 2

| Range bound | Explanation |
| --- | --- |
| MaxNrOfCells | Maximum length of the list. Value is 16. |

The Last Visited Cell Information may contain E-UTRAN or UTRAN cell specific information, as illustrated in the example depicted in Table 3.

TABLE 3

| IE/Group Name | Presence | Range | IE type and reference | Semantics description | Criticality | Assigned Criticality |
| --- | --- | --- | --- | --- | --- | --- |
| CHOICE Last Visited Cell Information | M | | | | — | — |
| >E-UTRAN Cell | | | | | | |
| >>Last Visited E-UTRAN Cell Information | M | | 9.2.1.43a | | — | — |
| >UTRAN Cell | | | | | | |
| >>Last Visited UTRAN Cell Information | M | | OCTET STRING | Defined in TS 25.413 [19] | — | — |
| >GERAN Cell | | | | | | |
| >>Last Visited GERAN Cell Information | M | | 9.2.1.43b | | — | — |

The Last Visited E-UTRAN Cell Information contains information about a cell that is to be used for radio resource management (RRM) purposes, as illustrated in the example depicted in Table 4.

TABLE 4

| IE/Group Name | Presence | Range | IE type and reference | Semantics description | Criticality | Assigned Criticality |
| --- | --- | --- | --- | --- | --- | --- |
| Global Cell ID | M | | E-UTRAN CGI 9.2.1.38 | | — | |
| Cell Type | M | | 9.2.1.66 | | — | |
| Small cell ID | M | | 9.2.1.xx | | | |
| Time UE stayed in Cell | M | | INTEGER (0 . . . 4095) | The duration of the time the UE stayed in the cell in seconds. If the UE stays in a cell more than 4095 s, this IE is set to 4095. | — | |
| Time UE stayed in Cell Enhanced Granularity | O | | INTEGER (0 . . . 40950) | The duration of the time the UE stayed in the cell in 1/10 seconds. If the UE stays in a cell more than 4095 s, this IE is set to 40950. | YES | ignore |
| HO Cause Value | O | | 9.2.1.3 | The cause for the handover from the E-UTRAN cell. Now this information also indicates whether the HO is related to small cell. | YES | ignore |

The cell type provides the cell coverage area. According to an embodiment, this cell type information does not just indicate the cell size, but also the property about whether the small cell is hidden from CN or not, as illustrated in Table 5. Table 6 illustrates an example of the small cell ID, according to an embodiment.

TABLE 5

| IE/Group Name | Presence | Range | IE type and reference | Semantics description | Criticality | Assigned Criticality |
|---|---|---|---|---|---|---|
| Cell Size | M | | ENUMERATED (very small, small, medium, large, . . .) | | — | — |
| Cell Visibility | M | | Hidden, non-hidden | | | |

TABLE 6

| IE/Group Name | Presence | Range | IE type and reference | Semantics description | Criticality | Assigned Criticality |
|---|---|---|---|---|---|---|
| Small cell id | M | | INTEGER (0 . . .) | | — | — |

A purpose of the Cause IE is to indicate the reason for a particular event for the S1AP protocol. An example is depicted in Table 7 below. In particular, Table 7 shows the possible impacts to the 3GPP LTE/LTE-A specifications. As outlined above, embodiments are directed to the introduction of the new HO cause IE.

TABLE 7

| IE/Group Name | Presence | Range | IE Type and Reference | Semantics Description |
|---|---|---|---|---|
| CHOICE Cause Group | M | | | |
| >Radio Network Layer | | | | |
| >>Radio Network Layer Cause | M | | ENUMERATED (Unspecified, TX2$_{RELOCOverall}$ Expiry, Successful Handover, Release due to E-UTRAN Generated Reason, Handover Cancelled, Partial Handover, Handover Failure In Target EPC/eNB Or Target System, Handover Target not allowed, TS1$_{RELOCoverall}$ Expiry, TS1$_{RELOCprep}$ Expiry, Cell not available, Unknown Target ID, No Radio Resources Available in Target Cell, Unknown or already allocated MME UE S1AP ID, Unknown or already allocated eNB UE S1AP ID, Unknown or inconsistent pair of UE S1AP ID, Handover desirable for radio reasons, Time critical handover, Resource optimisation handover, Reduce load in serving cell, User inactivity, Radio Connection With UE Lost, Load Balancing TAU Required, CS Fallback Triggered, UE Not Available For PS Service, Radio resources not available, Failure in the Radio Interface Procedure, Invalid QoS combination, Inter-RAT redirection, Interaction with other procedure, Unknown E-RAB ID, Multiple E-RAB ID instances, Encryption and/or integrity protection algorithms not supported, S1 intra system | |

TABLE 7-continued

| IE/Group Name | Presence | Range | IE Type and Reference | Semantics Description |
|---|---|---|---|---|
| | | | Handover triggered, S1 inter system Handover triggered, X2 Handover triggered . . . , Handover desirable for radio reasons in small cell, Redirection towards 1xRTT, Not supported QCI value, invalid CSG Id) | |
| >Transport Layer | | | | |
| >>Transport Layer Cause | M | | ENUMERATED (Transport Resource Unavailable, Unspecified, . . .) | |
| >NAS | | | | |
| >>NAS Cause | M | | ENUMERATED (Normal Release, Authentication failure, Detach, Unspecified, . . . , CSG Subscription Expiry) | |
| >Protocol | | | | |
| >>Protocol Cause | M | | ENUMERATED (Transfer Syntax Error, Abstract Syntax Error (Reject), Abstract Syntax Error (Ignore and Notify), Message not Compatible with Receiver State, Semantic Error, Abstract Syntax Error (Falsely Constructed Message), Unspecified, . . .) | |
| >Misc | | | | |
| >>Miscellaneous Cause | M | | ENUMERATED (Control Processing Overload, Not enough User Plane Processing Resources, Hardware Failure, O&M Intervention, Unspecified, Unknown PLMN, . . .) | |

The meaning of the different cause values is described in Table 8 below. In general, "not supported" cause values indicate that the related capability is missing. On the other hand, "not available" cause values indicate that the related capability is present, but insufficient resources were available to perform the requested action.

TABLE 8

| Radio Network Layer cause | Meaning |
|---|---|
| Unspecified | Sent for radio network layer cause when none of the specified cause values applies. |
| TX2RELOCOverall Expiry | The timer guarding the handover that takes place over X2 has abnormally expired. |
| . . . | |
| Invalid CSG Id | The CSG ID provided to the target eNB was found invalid. |
| Handover Desirable for Radio Reasons in small cell | The reason for requesting handover is radio related in small cell. |

As mentioned above, embodiments can provide a mechanism for ping-pong HO detection. With the UE history information structure according to embodiments discussed above, the new anchor eNB can check the last visited cells including those small cells under the previous anchoring eNB to check whether some ping-pong HOs have already occurred. If so, the new anchor eNB may also check whether the ping-pong HO is only related to the small cell, or the anchor eNB, or both small cell eNB and anchor eNB, according to a new added HO cause, i.e., Handover Desirable for Radio Reasons in small cell in the table.

One example to which this embodiment is applicable is provided as follows. In this example, it is assumed that there are three eNBs and the topology is eNB1-eNB2-eNB3. Of course, embodiments are not limited to this number of eNBs or to this topology. In this example, both eNB1 and eNB3 have the same small cell ID using #1. A UE HO occurs from eNB1 to eNB2, and the UE History IE includes cell #1. A UE HO then occurs from eNB2 to eNB3. The UE History IE includes cell #1, and eNB2's cell. Then, eNB3 may now have a problem because it considers the cell #1 in the UE history as its own small cell, and believes it is a ping-pong HO. However, such a problem can be avoided using the enhanced UE history IE format provided by embodiments of the invention, because these eNBs are able to distinguish the small cells anchored by different eNBs no matter whether they use the same small cell ID or not.

For MSE, the new anchoring eNB only needs the statistics of the number of cell changes that have happened during a certain time period, and with the new enhanced UE history information structure, MSE can be conducted properly. Cell visibility can be used to distinguish the invisible small cells for MSE consideration. A MSE algorithm can then decide whether the hidden small cells are counted or not. For a dual connectivity UE, it can be done freely whether to ignore the small cells or not during MSE. One embodiment is to follow the legacy approach where small cells are counted, such as in legacy femto/pico case. Another embodiment is to not count small cells because the PCell in source anchoring eNB should be the serving cell and small cell as secondary cell in target eNB may not be considered during MSE.

However, in case UE history information only contains the old anchoring cell info, this will prevent the usage of small cells in MSE. Embodiments do not necessarily impact conventional MSE but leave the freedom for a target eNB to determine whether the hidden small cells anchored by the source eNB are calculated or not.

Figure 1A:
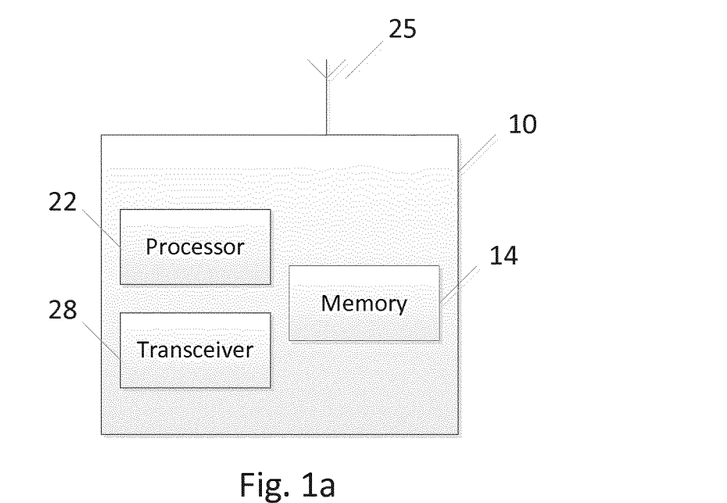
FIG. 1a illustrates an apparatus according to one embodiment.

FIG. 1a illustrates an example of an apparatus 10 according to an embodiment. In one embodiment, apparatus 10 may be a UE or mobile device. Further, it should be noted that one of ordinary skill in the art would understand that apparatus 10 may include components or features not shown in FIG. 1a.

As illustrated in FIG. 1a, apparatus 10 includes a processor 22 for processing information and executing instructions or operations. Processor 22 may be any type of general or specific purpose processor. While a single processor 22 is shown in FIG. 1a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a UE or mobile device. In this embodiment, apparatus 10 may be controlled by memory 14 and processor 22 to associate small cell identifiers that are assigned by an anchor eNB with a unique cell identifier related to the anchor eNB. Apparatus 10 may then be controlled by memory 14 and processor 22 to report the UE history information in dual connectivity mode to a target eNB. The UE history information may include the anchor eNB identifier, cell type information, and the small cell identifier associated with the unique higher level identifier.

Figure 1B:
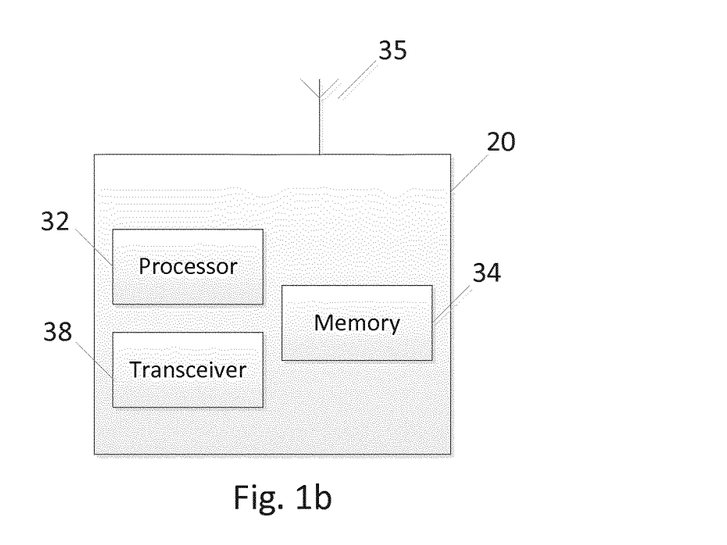
FIG. 1b illustrates an apparatus according to another embodiment.

FIG. 1b illustrates an example of an apparatus 20 according to another embodiment. In an embodiment, apparatus 20 may be a base station in a communications network, such as an eNB in LTE. It should be noted that one of ordinary skill in the art would understand that apparatus 20 may include components or features not shown in FIG. 1b.

As illustrated in FIG. 1b, apparatus 20 includes a processor 32 for processing information and executing instructions or operations. Processor 32 may be any type of general or specific purpose processor. While a single processor 32 is shown in FIG. 1b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a base station in a communications network, such as an eNB in LTE. In this embodiment, apparatus 20 may be controlled by memory 34 and processor 32 to receive UE history information in dual connectivity mode from a UE. The UE history information may include an anchor eNB identifier, cell type information, and the small cell identifier associated with a unique cell identifier related to the anchor eNB.

Figure 2:
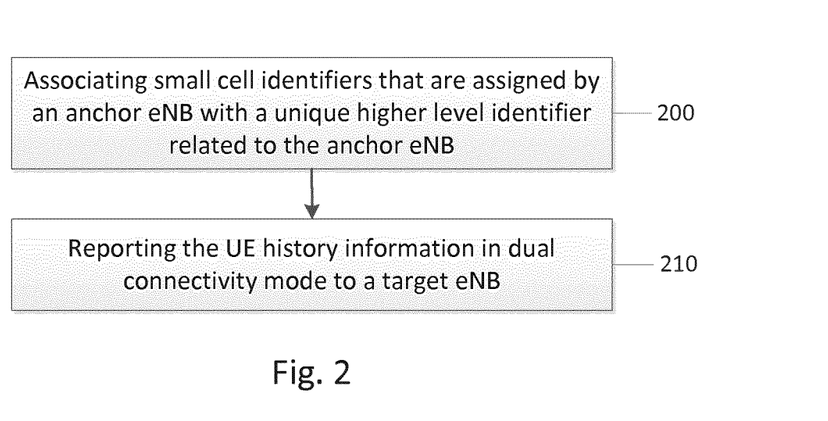
FIG. 2 illustrates a flow chart of a method according to one embodiment.

FIG. 2 illustrates an example of a flow diagram of a method, according to an embodiment. The method includes, at 200, associating small cell identifiers that are assigned by an anchor eNB with a unique cell identifier related to the anchor eNB. The method may also include, at 210, reporting the UE history information in dual connectivity mode to a target eNB. The UE history information may include the anchor eNB identifier, cell type information, and the small cell identifier associated with the unique cell identifier.

In some embodiments, the functionality of any of the methods described herein, such as those illustrated in FIG. 2 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

In view of the above, embodiments of the invention target inter-MeNB HO (not MeNB to SeNB HO) and discusses the problem of small cells that are 'hidden' from the CN by an anchor eNB because the small cell ids are locally assigned by the anchor eNB. As a result, embodiments provide a scheme making "hidden" small cells with the local cell IDs, assigned by the anchor eNBs in a dual connectivity case, unique/visible by tying the locally assigned cell id to the anchor cell id. Embodiments provide some flexibility in the MSE algorithm whether to count hidden cells when conducting MSE.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    associating, by a user equipment (UE), one or more small cell identifiers that are assigned by an anchor evolved node B (eNB) with a unique cell identifier related to the anchor eNB; and
    reporting, by the UE, a handover cause value associated with the reason for requesting handover, the unique cell identifier related to the anchor eNB, the one or more small cell identifiers associated by the UE with the unique cell identifier, and cell type information to a target eNB, wherein
    the UE is in a dual connectivity mode with the anchor eNB and the target eNB, and
    the cell type information comprises binary cell visibility information indicating whether one or more small cells are hidden from the core network.

2. The method according to claim 1, wherein the reporting further comprises reporting visited small cell information in dual connectivity mode to the target eNB in inter anchor eNB handover.

3. An apparatus, comprising:
    at least one processor; and
    at least one memory including computer program code,
    the at least one memory and computer program code configured, with the at least one processor, to cause the apparatus at least to:
    associate one or more small cell identifiers that are assigned by an anchor evolved node B (eNB) with a unique cell identifier related to the anchor eNB; and
    report a handover cause value associated with the reason for requesting handover, the unique cell identifier related to the anchor eNB, the one or more small cell identifiers associated by the UE with the unique cell identifier, and cell type information to a target eNB, wherein
    the apparatus is in a dual connectivity mode with the anchor eNB and the target eNB, and
    the cell type information comprises binary cell visibility information indicating whether one or more small cells are hidden from the core network.

4. The apparatus according to claim 3, comprising reporting visited small cell information in dual connectivity mode to the target eNB in inter anchor eNB handover.

5. A method, comprising:
    receiving, by a target evolved node B (eNB), a handover cause value associated with the reason for requesting handover, a unique cell identifier related to an anchor eNB, one or more small cell identifiers associated by a UE with the unique cell identifier, and cell type information, wherein
    the target eNB is connected to the anchor eNB via a UE dual connectivity mode, and
    the cell type information comprises binary cell visibility information indicating whether one or more small cells are hidden from the core network.

6. The method according to claim 5, wherein the receiving further comprises receiving visited small cell information during inter anchor eNB handover.

7. The method according to claim 6, further comprising checking the visited small cell information to determine whether any ping-pong handovers have occurred.

8. The method according to claim 6, further comprising calculating a mobility state estimation (MSE) based on at least one of a number of cell changes determined from the visited small cell information and the received information.

9. The method according to claim 8, wherein the calculating further comprises determining whether hidden small cells anchored by a source eNB are included in the calculation of the mobility state estimation (MSE).

10. An apparatus, comprising:
at least one processor; and
at least one memory including computer program code,
the at least one memory and computer program code configured, with the at least one processor, to cause the apparatus at least to:
receive a handover cause value associated with the reason for requesting handover, a unique cell identifier related to an anchor eNB, one or more small cell identifiers associated by a UE with the unique cell identifier, and cell type information, wherein
the apparatus is connected to the anchor eNB via a UE dual connectivity mode, and
the cell type information comprises binary cell visibility information indicating whether one or more small cells are hidden from the core network.

11. The apparatus according to claim 10, comprising receiving visited small cell information during inter anchor eNB handover.

12. The apparatus according to claim 11, comprising checking the visited small cell information to determine whether any ping-pong handovers have occurred.

13. The apparatus according to claim 11, comprising calculating a mobility state estimation (MSE) based on at least one of a number of cell changes determined from the visited small cell information and the received information.

14. The apparatus according to claim 13, comprising determining whether hidden small cells anchored by a source eNB are included in the calculation of the mobility state estimation (MSE).

* * * * *